United States Patent
Shea

(10) Patent No.: US 9,052,056 B1
(45) Date of Patent: Jun. 9, 2015

(54) SELF-RETRACTING HOOK DEVICE

(71) Applicant: David Shea, Staten Island, NY (US)

(72) Inventor: David Shea, Staten Island, NY (US)

( * ) Notice: Subject to any disclaimer, the term of this patent is extended or adjusted under 35 U.S.C. 154(b) by 0 days.

(21) Appl. No.: 14/085,268

(22) Filed: Nov. 20, 2013

(51) Int. Cl.
*F16B 45/00* (2006.01)
*F16M 13/02* (2006.01)

(52) U.S. Cl.
CPC .............. *F16M 13/02* (2013.01); *F16M 13/022* (2013.01)

(58) Field of Classification Search
CPC .............................. F16M 13/02; F16M 13/022
USPC ................................ 248/304, 308, 317, 309.1
See application file for complete search history.

(56) References Cited

U.S. PATENT DOCUMENTS

| | | | |
|---|---|---|---|
| 2,071,257 A * | 2/1937 | Hansen | 248/294.1 |
| 2,901,207 A * | 8/1959 | Adam | 248/294.1 |
| 3,941,250 A | 3/1976 | Ott | |
| 3,957,241 A * | 5/1976 | Morris et al. | 248/288.31 |
| D385,480 S | 10/1997 | Mayo | |
| D389,399 S | 1/1998 | Bries et al. | |
| 5,971,684 A | 10/1999 | Wang | |
| 6,199,811 B1 | 3/2001 | Fargo | |
| 6,991,204 B2 | 1/2006 | Ay | |
| 7,118,082 B2 | 10/2006 | Brnjac | |
| 8,550,417 B2 * | 10/2013 | Lee et al. | 248/304 |

* cited by examiner

*Primary Examiner* — Amy Sterling

(57) ABSTRACT

A self-retracting hook device for positioning on or near a door provides support for grocery bags or the like while remaining in a retracted position against a surface when not in use. The device includes a mounting plate having a front face and a back face. A bracket is coupled to the front face of the mounting plate. An arm has a lower end pivotally coupled to the bracket such that the arm is pivotable between an extended position and a retracted position. A biasing member is coupled to the arm and the bracket, the biasing member urging the arm into the retracted position.

9 Claims, 3 Drawing Sheets

SELF-RETRACTING HOOK DEVICE

BACKGROUND OF THE DISCLOSURE

Field of the Disclosure

The disclosure relates to hook devices and more particularly pertains to a new hook device for positioning on or near a door to provide support for grocery bags or the like while remaining in a retracted position against a surface when not in use.

SUMMARY OF THE DISCLOSURE

An embodiment of the disclosure meets the needs presented above by generally comprising a mounting plate having a front face and a back face. A bracket is coupled to the front face of the mounting plate. An arm has a lower end pivotally coupled to the bracket such that the arm is pivotable between an extended position and a retracted position. A biasing member is coupled to the arm and the bracket, the biasing member urging the arm into the retracted position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
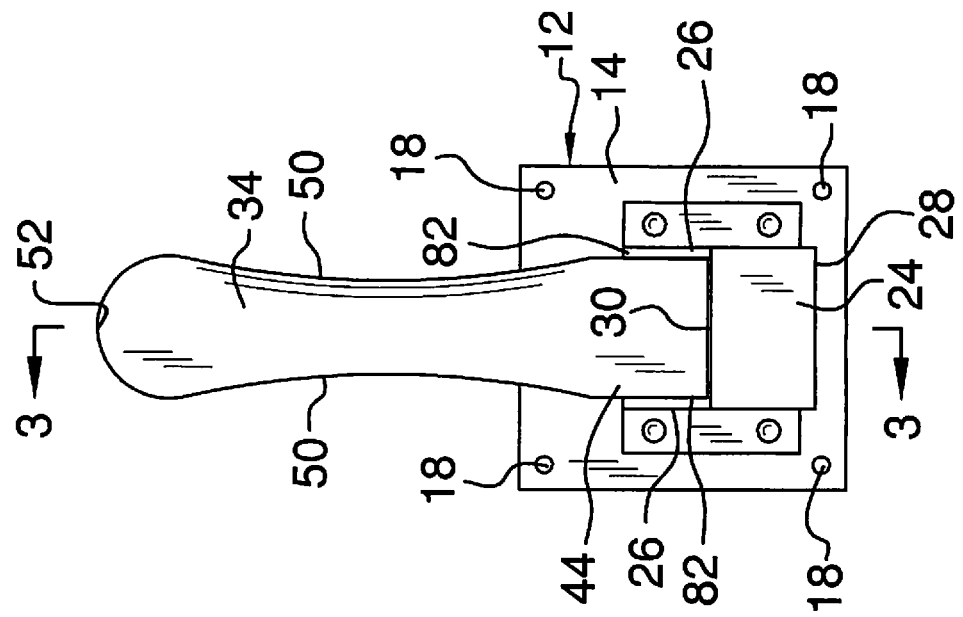
FIG. 1 is a top front side perspective view of a self-retracting hook device according to an embodiment of the disclosure.
Figure 2:
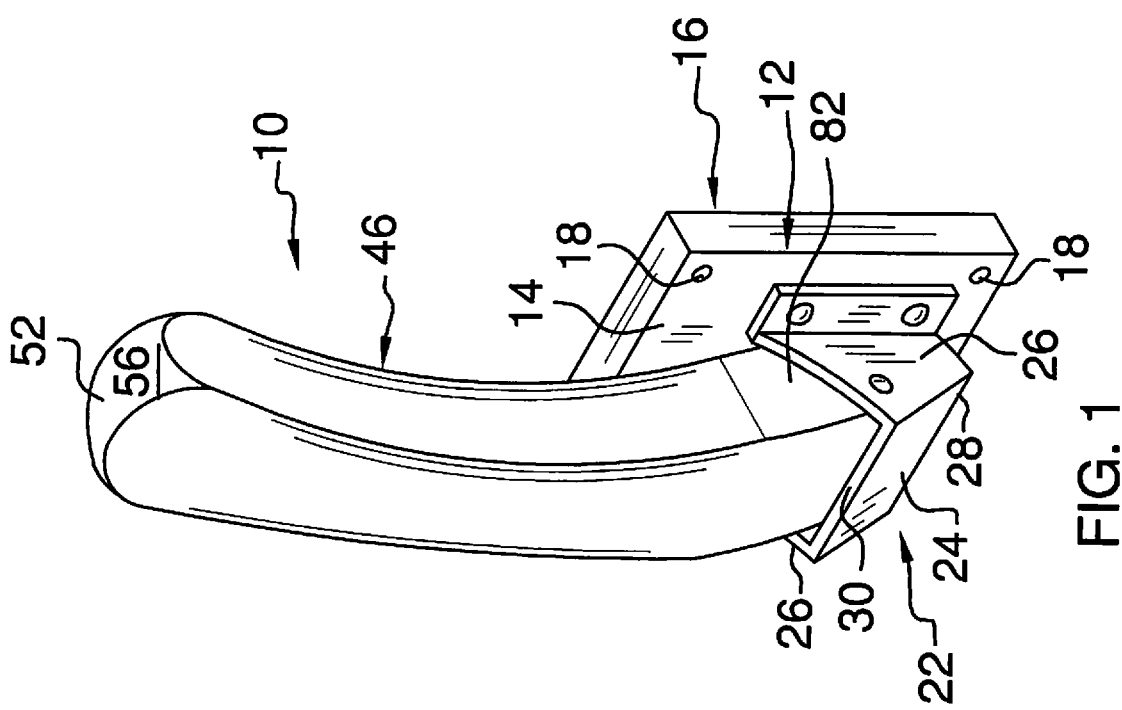
FIG. 2 is a front view of an embodiment of the disclosure.
Figure 4:
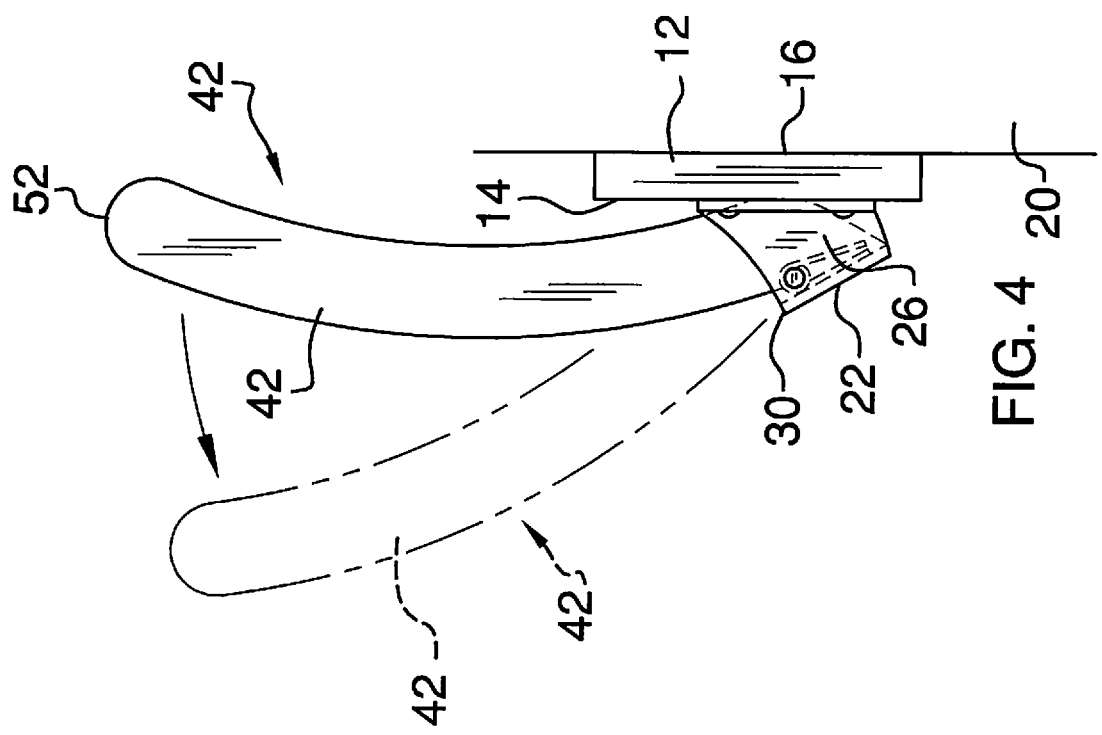
FIG. 4 is a side view of an embodiment of the disclosure.

With reference now to the drawings, and in particular to FIGS. 1 through 5 thereof, a new hook device embodying the principles and concepts of an embodiment of the disclosure and generally designated by the reference numeral 10 will be described.

As best illustrated in FIGS. 1 through 5, the self-retracting hook device 10 generally comprises a mounting plate 12 having a planar front face 14 and a planar back face 16. Apertures 18 extend through the mounting plate 12 between the front face 14 and the back face 16 to facilitate attaching the mounting plate 12 to a support surface 20 such as a door, wall, stand, frame, or the like. A bracket 22 is coupled to the front face 14 of the mounting plate 12. The bracket 22 has a forward wall 24 and a pair of lateral side walls 26. Each of the lateral side walls 26 may be transverse to the mounting plate 12. The forward wall 24 is angled relative to the mounting plate 12 such that the forward wall 24 extends upwardly and away from the mounting plate 12 extending from a bottom edge 28 of the forward wall 24 to a top edge 30 of the forward wall 32.

Figure 3:
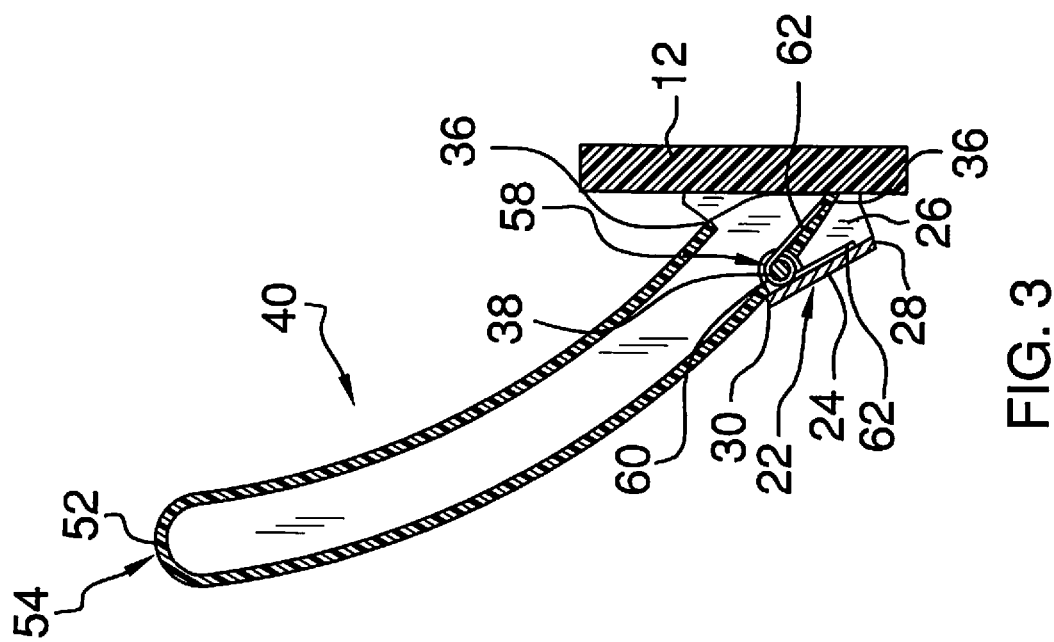
FIG. 3 is a cross-sectional view of an embodiment of the disclosure taken along line 3-3 of FIG. 2.
Figure 5:
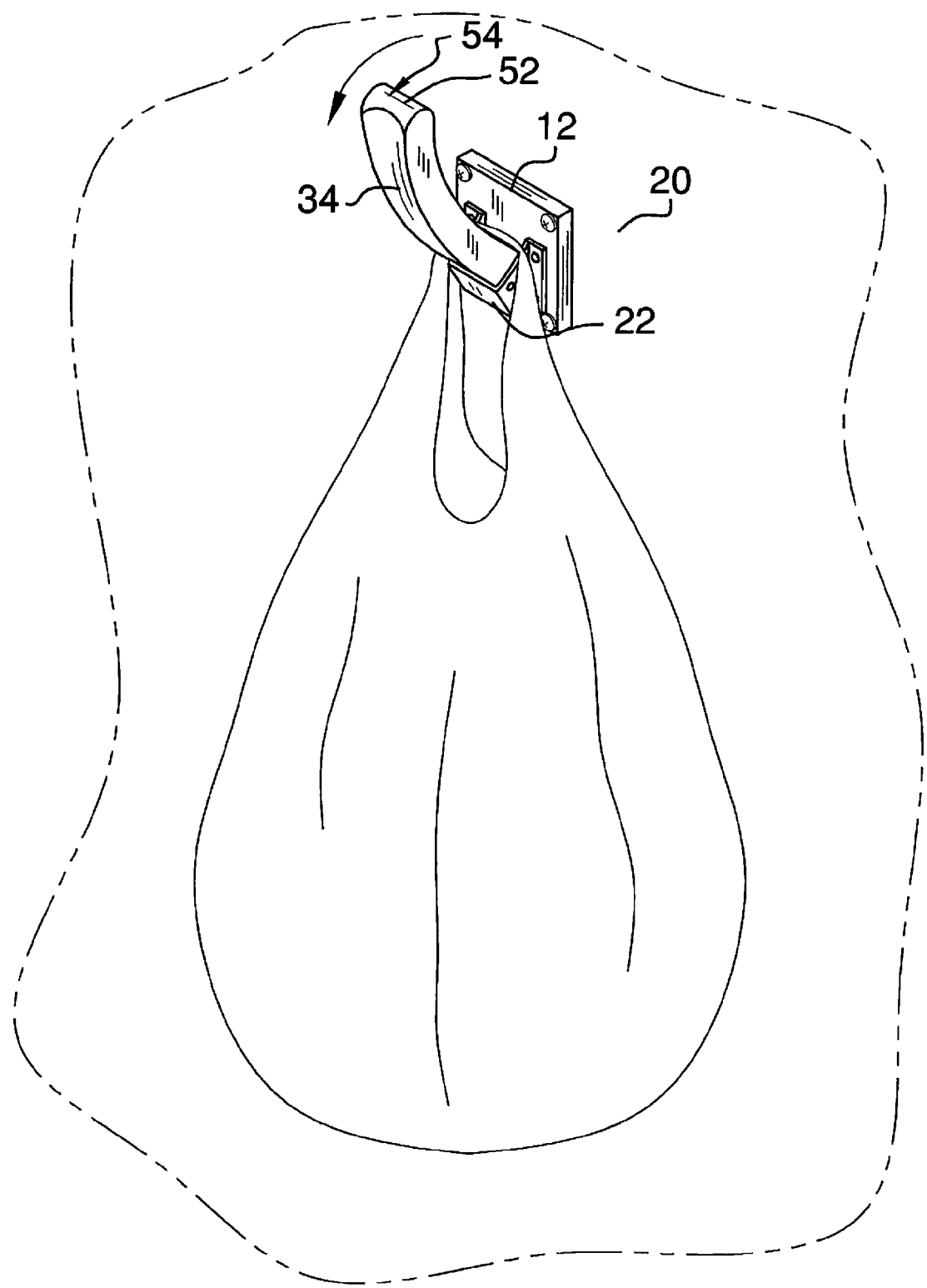
FIG. 5 is a top front side perspective view of an embodiment of the disclosure in use.

An arm 34 has a lower end 36 pivotally coupled to the bracket 22 by a pin 38 extending between the lateral side walls 26. Thus, the arm 34 is pivotable between an extended position 40 and a retracted position 42. The arm 34 has a lower portion 44 which has straight sides 82 and is positioned in the bracket 22 extending between the lateral side walls 26. The arm 34 has an upper portion 46 extending from the lower portion 44. The upper portion 46 is curved such that the upper portion 46 curves rearwardly towards the front face 14 of the mounting plate 12 as the upper portion 46 extends away from the lower portion 44. The upper portion 46 has a pair of concavely arcuate lateral sides 50. The arm 34 abuts the top edge 30 of the forward wall 26 when the arm 34 is in a fully extended position 40. A top end 52 of the arm 34 has an arcuate cross-sectional outer surface 54 transverse to the mounting plate 12 and parallel to a longitudinal axis of the arm 34 as shown in FIG. 3. As shown in FIG. 1, the top end 52 of the arm 34 may have a convex semi-spherical surface 56. The surfaces 54,56 facilitate sliding loops of a conventional plastic shopping bag, or the like, over the top end 52 and between the arm 34 and the mounting plate 12 wherein the arm 34 will pivot into the extended position 40 and support the shopping bag on the device 10.

A biasing member 58 is coupled to the arm 34 and the bracket 22. The biasing member 58 urges the arm 34 into the retracted position 42 such that the top end 52 is pointed generally back towards the mounting plate 12 to reduce the probability of bumping into or otherwise accidentally contacting the arm 34 when not in use. The biasing member 58 comprises a helical torsion spring 60 having a pair of end sections 62. Each of the end sections 62 is straight. Each of the end sections 62 abuts an associated one of the bracket 22 and the arm 34 to urge the arm 34 to pivot into the retracted position 42.

In use, the mounting plate 12 is fixed to a desired location such as on or near a door. The arm 34 is held in the retracted position 42 until such time as shopping bags or the like are positioned on the arm 34.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A self-retracting hook device comprising:
   a mounting plate having a front face and a back face;
   a bracket coupled to said front face of said mounting plate;
   an arm having a lower end pivotally coupled to said bracket wherein said arm is pivotable between an extended position and a retracted position, said arm having a lower portion being positioned in said bracket, an upper portion extending upwardly from said lower portion and a top end positioned opposite of said lower portion, said upper portion having an inner surface facing said plate and an outer surface facing away from said plate, said upper portion having a pair of lateral sides, each of said lateral sides being concavely arcuate, said arm having a width dimension defined extending between said lateral sides, said width dimension decreasing from said lower portion to a central portion of said arm and increasing from said central portion to said top end; and a biasing member coupled to said arm and said bracket, said biasing member urging said arm into said retracted position.

2. The device of claim 1, wherein said lower portion is positioned in said bracket.

3. The device of claim 2, wherein said upper portion is curved such that said upper portion extends rearwardly towards said front face of said mounting plate as said upper portion extends away from said lower portion, said inner surface being continuously arcuate from said lower portion to said top end.

4. The device of claim 1, further comprising a top end of said arm having a convex semi-spherical surface.

5. The device of claim 1, further comprising a top end of said arm having an arcuate cross-sectional outer surface transverse to said mounting plate and parallel to a longitudinal axis of said arm.

6. The device of claim 1, further comprising said biasing member comprising a helical torsion spring having a pair of straight end sections, each of said end sections being straight, each of said end sections abutting an associated one of said bracket and said arm.

7. The device of claim 1, further comprising said bracket having a forward wall and a pair of lateral side walls, each of said lateral side walls being transverse to said mounting plate, said forward wall being angled relative to said mounting plate such that said forward wall extends upwardly and away from said mounting plate between a bottom edge of said forward wall and a top edge of said forward wall.

8. The device of claim 7, further comprising said arm abutting said top edge of said forward wall when said arm is in a fully extended position.

9. A self-retracting hook device comprising:

a mounting plate having a front face and a back face;

a bracket coupled to said front face of said mounting plate, said bracket having a forward wall and a pair of lateral side walls, each of said lateral side walls being transverse to said mounting plate, said forward wall being angled relative to said mounting plate such that said forward wall extends upwardly and away from said mounting plate between a bottom edge of said forward wall and a top edge of said forward wall, said arm abutting said top edge of said forward wall when said arm is in a fully extended position;

an arm having a lower end pivotally coupled to said bracket wherein said arm is pivotable between an extended position and a retracted position, said arm having a lower portion, said lower portion having straight sides, said lower portion being positioned in said bracket, said arm having an upper portion extending from said lower portion, said upper portion being curved such that said upper portion extends rearwardly towards said front face of said mounting plate as said upper portion extends away from said lower portion, said upper portion having a pair of concavely arcuate lateral sides, said arm having a width dimension defined extending between said lateral sides, said width dimension decreasing from said lower portion to a central portion of said arm and increasing from said central portion to said top end;

a top end of said arm having an arcuate cross-sectional outer surface transverse to said mounting plate and parallel to a longitudinal axis of said arm, said top end of said arm having a convex semi-spherical surface; and a biasing member coupled to said arm and said bracket, said biasing member urging said arm into said retracted position, said biasing member comprising a helical torsion spring having a pair of straight end sections, each of said end sections being straight, each of said end sections abutting an associated one of said bracket and said arm.

\* \* \* \* \*